(12) United States Patent
Wakabayashi

(10) Patent No.: US 7,956,974 B2
(45) Date of Patent: Jun. 7, 2011

(54) LIQUID CRYSTAL DEVICE AND ELECTRONIC APPARATUS

(75) Inventor: Junichi Wakabayashi, Nagano (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 12/190,062

(22) Filed: Aug. 12, 2008

(65) Prior Publication Data

US 2009/0086146 A1   Apr. 2, 2009

(30) Foreign Application Priority Data

Sep. 28, 2007   (JP) ................................. 2007-254146

(51) Int. Cl.
*G02F 1/1343* (2006.01)
(52) U.S. Cl. ........................................................ 349/141
(58) Field of Classification Search .................... 349/141
See application file for complete search history.

(56) References Cited

U.S. PATENT DOCUMENTS

2007/0002251 A1 *   1/2007   Chang et al. .................. 349/141

FOREIGN PATENT DOCUMENTS

JP   2002-296611 A   10/2002

* cited by examiner

*Primary Examiner* — Mark A Robinson
*Assistant Examiner* — Jerry Blevins
(74) *Attorney, Agent, or Firm* — K&L Gates LLP

(57) ABSTRACT

Provided is a liquid crystal display device including: a pair of substrates having a liquid crystal layer interposed therebetween; a pixels which is provided along a predetermined arrangement axis and constitutes a display area; sub pixels constituting the pixels; pixel electrodes which are disposed on one of the pair of substrates and are provided in correspondence with the sub pixels; and a common electrode which is provided on the pixel electrodes with an insulating film interposed therebetween, wherein the common electrodes includes first electrodes which extend in a direction obliquely intersecting the arrangement axis, a second electrode which has a portion obliquely intersecting the first electrodes and connects one ends of the first electrodes, and a third electrode which has a portion obliquely intersecting the first electrodes and connects the other ends of the first electrodes.

13 Claims, 12 Drawing Sheets

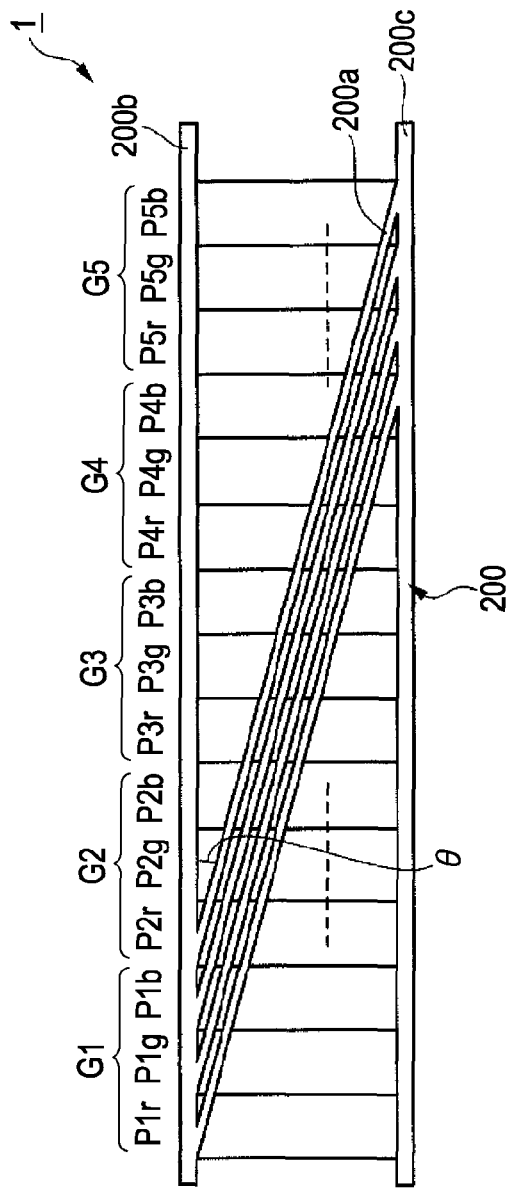
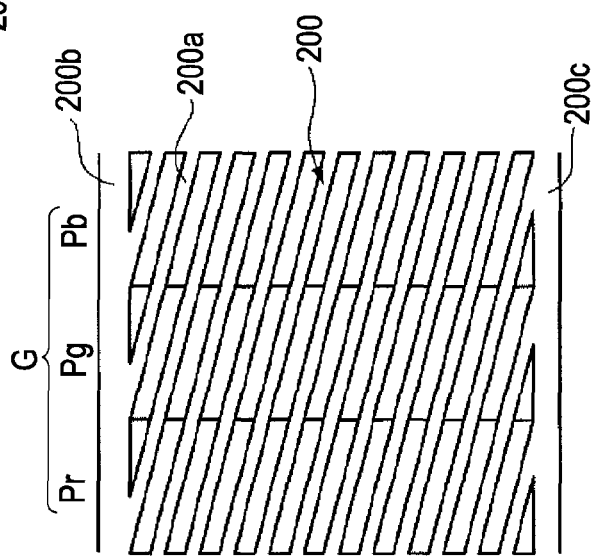
FIG. 4A
FIG. 4B

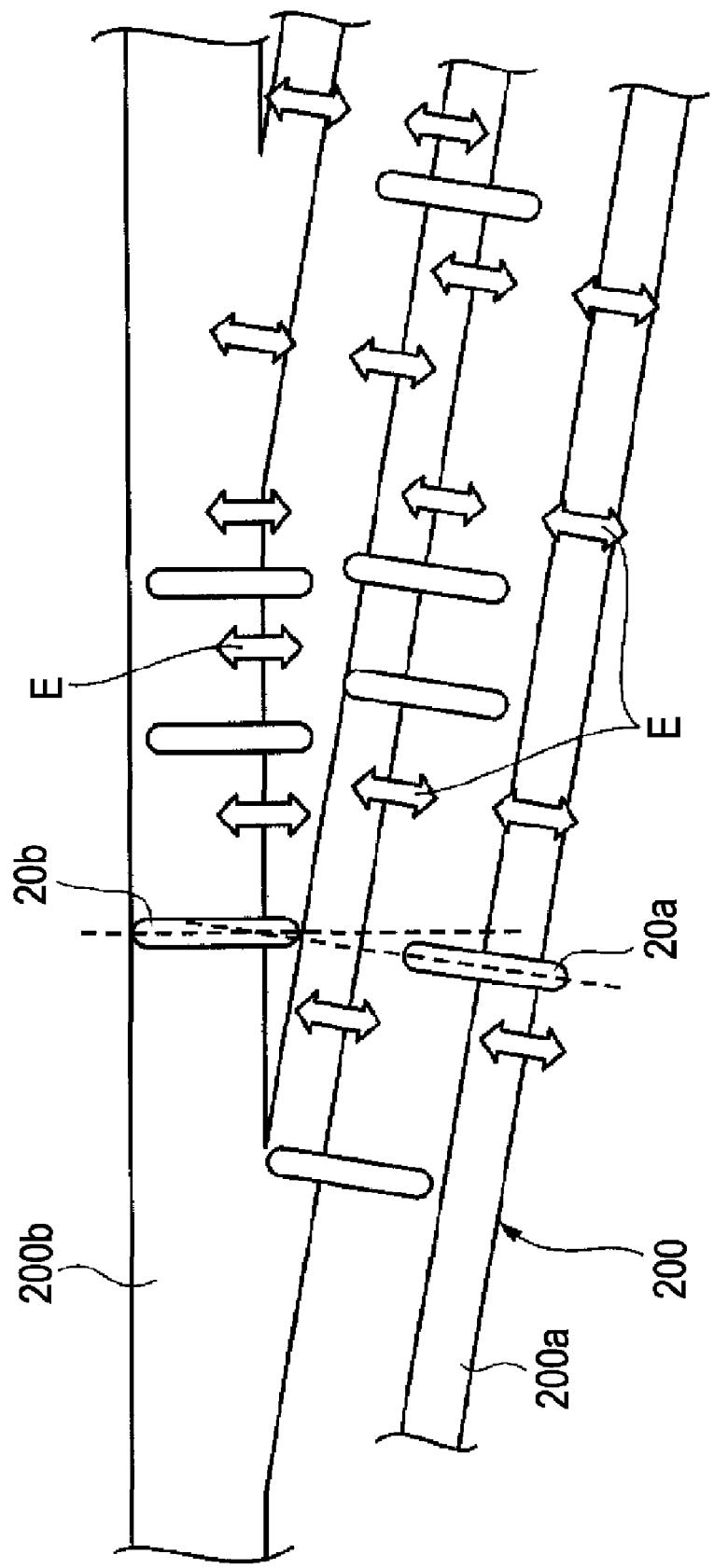

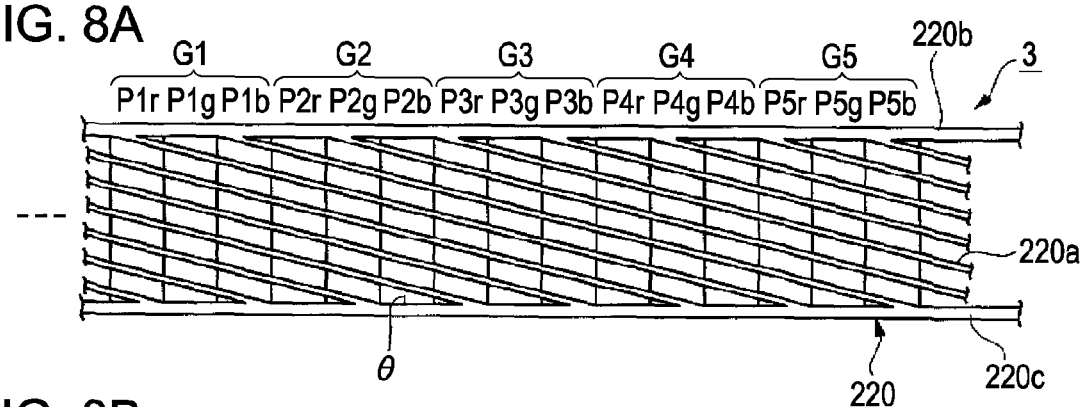
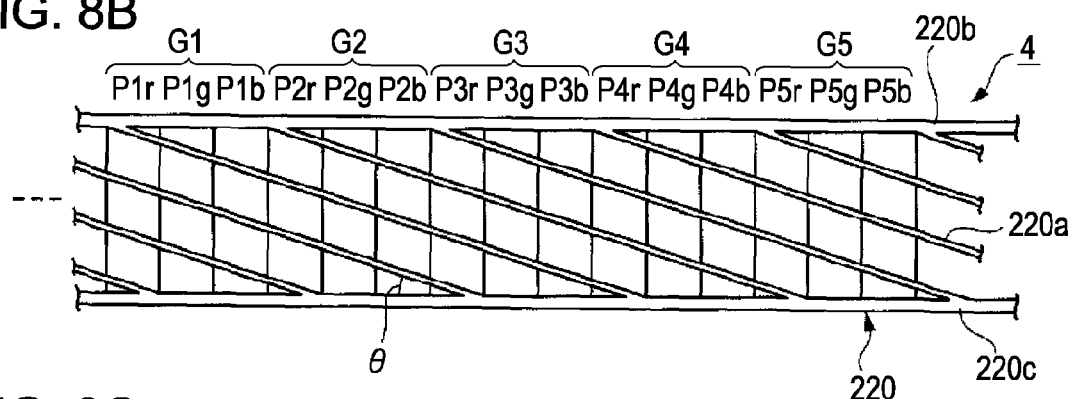
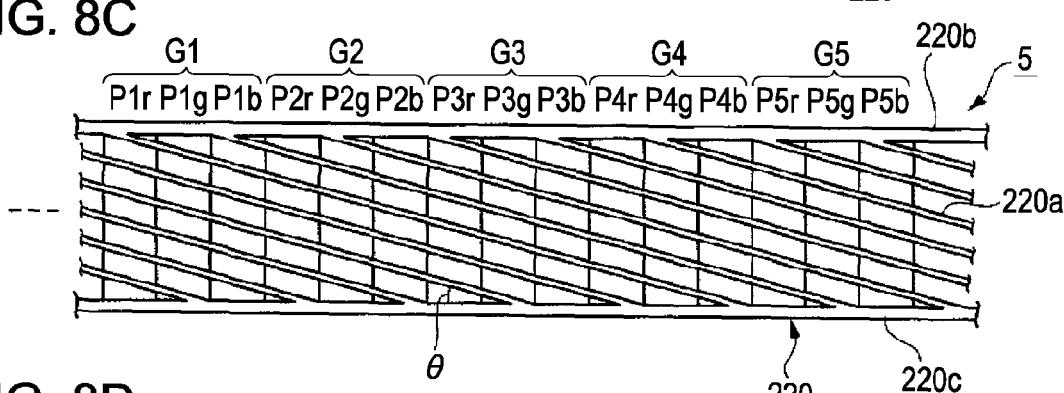
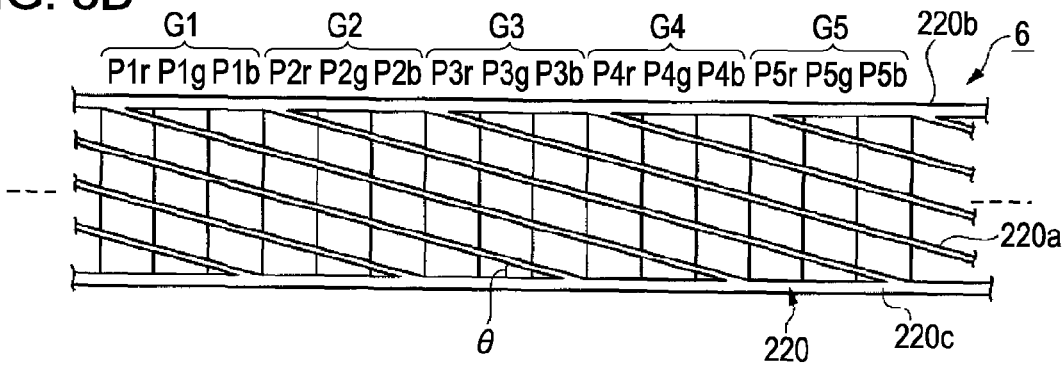

LIQUID CRYSTAL DEVICE AND ELECTRONIC APPARATUS

RELATED APPLICATIONS

The present application is based on, and claims priority from, Japanese Application Number 2007-254146, filed Sep. 28, 2007, the disclosure of which is hereby incorporated by reference herein in its entirety.

BACKGROUND

1. Technical Field

The present invention relates to a liquid crystal display device and an electronic apparatus.

2. Related Art

As research and development for improving quality and performance of a liquid crystal display device, technologies of widening a viewing angle of the liquid crystal display device are studied. Among them, an in-plane switching (IPS) method of generating an electric field in a substrate in an in-plane direction (horizontal direction) and rotating liquid crystal molecules in the plane parallel to the substrate by the electric field in the horizontal direction so as to control transmitted light is put to practical use. In addition, a fringe-field switching (FFS) method which is an improvement of the IPS method is suggested.

FIG. 11 is a schematic view showing the FFS method, wherein FIG. 10A shows the shape of liquid crystal when the electric field is not generated and FIG. 11B shows the shape of the liquid crystal when the electric field is generated. In the FFS method, liquid crystal molecules 302 are interposed between a pair of substrates 300 and 301 and the liquid crystal molecules 302 are driven by the electric field E generated by a pair of electrodes 303 and 304 provided on one substrate with an insulating layer 305 interposed therebetween. When the electric field E is not generated, the liquid crystal molecules 302 are arranged in parallel to the comb-shaped electrode 303 (FIG. 11A) and, when the electric field E is generated, the liquid crystal molecules 302 are rotated by 90 degrees in the horizontal direction and are arranged in the generation direction of the electric field E (FIG. 11B). Since the FFS type liquid crystal display device has a larger numerical aperture than the IPS type liquid crystal display device, the development thereof is actively progressed (for example, JP-A-2002-296611).

However, the FFS type liquid crystal monitor has the following problems. FIG. 12 is a plan view showing a general example of the shape of an electrode related to the FFS type liquid crystal display device. In the drawing, a plurality of first electrodes 303a extending a vertical direction and a second electrode 303b and a third electrode 303c which are extended in a horizontal direction and are connected to the first electrodes 303a are integrally formed, thereby forming a trapezoidal electrode 303. In an area in which the electrode 303 is not formed, a rectangular slit 306 is formed in plan view.

When a voltage is applied between the electrode 303 and an electrode 304 (not shown), an electric field E denoted by an arrow is generated such that liquid crystal molecules 302 are arranged in an electric field direction. At this time, since the first electrodes 303a and the second electrode 303b are different from each other in the extension direction, the directions of the electric fields generated in the vicinities of the electrodes are different from each other. In other words, the electric field generated from the first electrodes 303a is dominant in an area AR1 in the vicinity of a central portion of the slit 306 and the electric field generated from the second electrode 303b and the third electrode 303c is dominant in areas AR2 in the vicinities of the both ends of the slit 306 in a longitudinal direction. Thus, the directions of the electric fields E are shifted by 90 degrees on the basis of the extension directions of the electrodes in the areas AR1 and AR2. As a result, the area AR1 and AR2 are different from each other in the arrangement direction of the liquid crystal molecules 302 and disclination of the arrangement is generated. The disclination deteriorates light transmissivity, contrast and optical characteristics.

In the existing FFS type device, areas, in which the directions of the electric fields are different from each other by the shape of the electrode, are generated and the arrangement directions of the liquid crystal thereof are different from each other. Thus, the optical characteristics deteriorate.

SUMMARY

An advantage of some aspects of the invention is that it provides a liquid crystal display device with high light transmissivity, which is capable of reducing influence of disclination by optimizing the shape of a common electrode.

Another advantage of some aspects of the invention is that it provides an electronic apparatus including the liquid crystal display device with the high light transmissivity.

According to an aspect of the invention, there is provided a liquid crystal display device including: a pair of substrates having a liquid crystal layer interposed therebetween; a plurality of pixels which is provided along a predetermined arrangement axis and constitutes a display area; a plurality of sub pixels constituting the pixels; a plurality of pixel electrodes which are disposed on one of the pair of substrates and are provided in correspondence with the plurality of sub pixels; and a common electrode which is provided on the plurality of pixel electrodes with an insulating film interposed therebetween, wherein the common electrodes includes a plurality of first electrodes which extend in a direction obliquely intersecting the arrangement axis, a second electrode which has a portion obliquely intersecting the plurality of first electrodes and connects one ends of the plurality of first electrodes, and a third electrode which has a portion obliquely intersecting the plurality of first electrodes and connects the other ends of the plurality of first electrodes.

Disclination which causes deterioration of image quality is generated at a position where the directions of the horizontal electric fields for driving the liquid crystal molecules are not uniform and are disturbed. For example, since the directions of the horizontal electric fields generated from the electrodes are different at the intersections between the electrodes having different extension directions, the directions of the horizontal electric fields are not uniform and disclination is generated. Since the horizontal electric fields are generated in two directions at a position where the electrodes intersects each other at a right angle, the alignment of the driven liquid crystal molecules is changed by 90 degrees and the influence of disclination becomes a maximum.

If the common electrode extends from one end to the other end of the display area in a stripe shape, the directions of the horizontal electric fields are uniform and disclination is not generated. However, in this case, other problems occur. Generally, the common electrode included in the liquid crystal display device is formed of a material having higher resistivity than other lines. If the common electrode lengthens, liquid crystal response timings of positions which are close to or distant from a side of supplying a voltage signal to the common electrode are different by a time constant due to parasitic capacitance between resistance values of the electrodes and a wiring layer formed in other layers or liquid crystal. A difference between the response timings causes flicker of an image or crosstalk between signals so as to deteriorate image quality.

By this constitution, the first electrodes extend so as to obliquely intersect the pixel arrangement direction and the second electrode and the third electrode extend so as to obliquely intersect the first electrodes. Accordingly, in the vicinities of the connections between the second electrode or the third electrode and the first electrodes, the direction of the horizontal electric field generated from the first electrodes obliquely intersects the direction of the horizontal electric field generated from the second electrode or the third electrode and the horizontal electric fields difference of 90 degrees which the influence of disclination becomes a maximum can be avoided. Accordingly, it is possible to obtain a liquid crystal display device in which the influence of inclination is reduced. In addition, since the first electrodes are connected to the second electrode and the third electrode, a voltage signal can be delivered via a short path. Accordingly, it is possible to reduce a response timing difference and obtain a liquid crystal display device in which flicker or crosstalk is reduced.

In the invention, the plurality of first electrodes may be at least partially arranged in parallel to each other at a predetermined interval.

By this constitution, since the interval between the adjacent first electrodes is uniform, the intensity of the electric field spread between the both electrodes is not changed and the horizontal electric field having uniform intensity can be generated in the vicinities of the first electrodes. Accordingly, it is possible to eliminate unevenness in the driving of the liquid crystal molecules and obtain a high-quality liquid crystal display device.

In the invention, the term "parallel" indicates the state in which the lines extend so as not to intersect each other and indicates the state in which one of the first electrodes extend along the other first electrodes. The term "parallel" includes a mathematical parallel state and the effect of the invention is high when the arrangement of the lines is close to the mathematical parallel. However, the lines may not be strictly parallel to each other due to a manufacturing error and may be approximately parallel to each other. Hereinafter, the term "parallel" will be described in the same meaning.

In the invention, in the display area, pixels of one column which are provided along the predetermined arrangement axis may be provided in a plurality of numbers in a direction orthogonal to the arrangement axis, and the second electrode and the third electrode may be disposed so as to overlap with inter-pixel areas, which extend in the direction of the arrangement axis, in a plane.

By this constitution, the intersections between the first electrodes and the second electrode and the intersections between the first electrodes and the third electrode are disposed on the ends of the pixels. Accordingly, positions where disclination is generated become the ends of the pixels for performing the display and the central portions of the pixels can perform a good display. Accordingly, it is possible to obtain a liquid crystal display device in which the influence of disclination on the image quality is reduced.

In the invention, the second electrode and the third electrode may be disposed in the adjacent inter-pixel areas in a direction orthogonal to the arrangement axis.

By this constitution, since the pixels are interposed between the second electrode and the third electrode, the same disclination is generated between the rows in which the pixels are arranged. Accordingly, it is possible to eliminate the difference between the rows and obtain a liquid crystal display device which can realize a display while suppressing color unevenness. In this case, the plurality of first electrodes may be arranged in parallel to each other at a predetermined interval.

In the invention, the interval between one ends of the adjacent first electrodes in the arrangement axis direction may be at least partially equal to the width of each of the pixels in the arrangement axis direction.

By this constitution, since the number of first electrodes which traverse the pixels is identical in all the pixels, the intensities of the horizontal electric fields generated on the basis of the first electrodes in all the pixels become identical. Accordingly, it is possible to drive the liquid crystal molecules based on the horizontal electric fields having the same intensity between the pixels and obtain a liquid crystal display device which can realize a good display without color unevenness.

In the invention, each of the pixels may include a parallelogram including a vertical side portion which extends in a direction orthogonal to the arrangement axis and an oblique side portion which extends in a direction obliquely intersecting the vertical side portion, the plurality of first electrodes may extend in parallel to the oblique side portion, the second electrode may include a plurality of main lines which extend in parallel to the oblique side portion and connecting portions which extend in parallel to the vertical side portion and connect the plurality of main lines, and the third electrode may include a plurality of main lines which extend in parallel to the oblique side portion and connecting portions which extend in parallel to the vertical side portion and connect the plurality of main lines.

By this constitution, the shapes of the first electrodes which overlap with the sub pixels included in the pixels in a plane are identical. Accordingly, it is possible to equalize the intensities of the horizontal electric fields of the sub pixels and obtain a liquid crystal display device which can realize an excellent display while suppressing color unevenness.

In the invention, one ends of the plurality of first electrodes may be disposed on the connection portions.

By this constitution, the common electrode includes the plurality of first electrodes and the horizontal electric fields from the first electrodes can be generated at a minute interval. Accordingly, it is possible to control the driving of the liquid crystal by a high-precision electric field and obtain a high-quality liquid crystal display device.

In the invention, the interval between one ends and the other ends of the first electrodes in the arrangement axis direction may be a multiple of the width of the pixel in the arrangement axis direction.

By this constitution, since the number of first electrodes which traverse the sub pixels is identical in all the sub pixels, the intensities of the horizontal electric fields generated on the basis of the first electrodes in all the sub pixels are identical. Accordingly, it is possible to drive the liquid crystal molecules on the basis of the horizontal electric fields having the same intensity between the sub pixels and obtain a liquid crystal display device which can realize a good display without color unevenness.

In the invention, the sub pixels may have the same shape, and the interval between one ends of the adjacent first electrodes in the arrangement axis direction may be equal to the width of the sub pixels in the arrangement axis direction.

By this constitution, since the number of first electrodes which traverse the sub pixels is identical in all the sub pixels, the intensities of the horizontal electric fields generated on the basis of the first electrodes in all the sub pixels are identical. Accordingly, it is possible to drive the liquid crystal molecules on the basis of the horizontal electric fields having the same intensity between the sub pixels and obtain a liquid crystal display device which can realize a good display without color unevenness.

In the invention, the sub pixels may have the same shape, and the interval between one ends of the adjacent first electrodes in the arrangement axis direction may be equal to the width of integral submultiple of the width of the sub pixels in the arrangement axis direction. By this constitution, the plurality of first electrodes can be arranged and the horizontal electric field from the first electrodes can be generated at a minute interval. Accordingly, it is possible to drive the liquid crystal with high precision and obtain a high-quality liquid crystal display device.

In the invention, one or both of an angle between the first electrodes and the second electrode and an angle between the first electrodes and the third electrode may be 1 degree to 15 degrees.

If the angle is less than 1 degree, the extending first electrodes are excessively long and flicker or crosstalk occurs due to the resistance of the first electrodes. If the angle is greater than 15 degrees, the angle difference between the horizontal electric field generated from the first electrodes and the horizontal electric field generated from the second electrode or the third electrode is increased and the influence of disclination generated in the vicinities of the first electrodes and the second electrode or the vicinities of the first electrodes and the third electrode is increased. Accordingly, by forming the electrodes in the range of the angle, disclination is more efficiently reduced and an image display device with improved light transmissivity can be obtained.

In the invention, the common electrode may include a pair of fourth electrodes which connects adjacent both ends of the second electrode and the third electrode, one of the pair of fourth electrodes may be connected to one ends of the plurality of first electrodes, the other of the pair of fourth electrodes may be connected to the other ends of the plurality of first electrodes, and the common electrode may protrude to the outside of the display area and the pair of fourth electrodes may be disposed at the outside of the display area.

By this constitution, the fourth electrodes connect the ends of the first electrodes, the second electrode and the third electrode. Since the direction of the horizontal electric field generated from the fourth electrodes and the direction of the horizontal electric field generated from the electrodes are different from each other, disclination is generated in the vicinities of the connections between the fourth electrodes and the electrodes. However, since the fourth electrodes are disposed at the outside of the display area, a position where disclination is generated is a position which the display is not influenced. Accordingly, it is possible to provide a liquid crystal display device which can realize a high-quality display.

In the invention, the second electrode and the third electrode may be formed of a conductive material having a lower resistivity than that of the first electrodes.

By forming the second electrode or the third electrode by a low-resistance material, the resistance of the overall common electrode can be decreased and a liquid crystal display device in which flicker or crosstalk is reduced can be obtained.

According to another aspect of the invention, there is provided an electronic apparatus including the above-described liquid crystal display device.

By this constitution, it is possible to realize an electronic apparatus including a high-precision liquid crystal display unit.

BRIEF DESCRIPTION OF THE DRAWINGS

The invention will be described with reference to the accompanying drawings, wherein like numbers reference like elements.

FIG. 4 is a view showing the shape and the arrangement of a common electrode included in the liquid crystal display device.

FIG. 5 is a schematic view showing the state of driving liquid crystal molecules and a horizontal electric field direction of the liquid crystal display device.

FIG. 8 is a view showing the shape and the arrangement of a common electrode of a liquid crystal display device according to a third embodiment of the invention.

DESCRIPTION OF EXEMPLARY EMBODIMENTS

First Embodiment

Hereinafter, a liquid crystal display device according to a first embodiment of the invention will be described with reference to FIGS. 1 to 6. In drawings used in the below description, the scale of each element is differentiated from each other in order that each layer or each element has a size capable of being identified.

Figure 1:
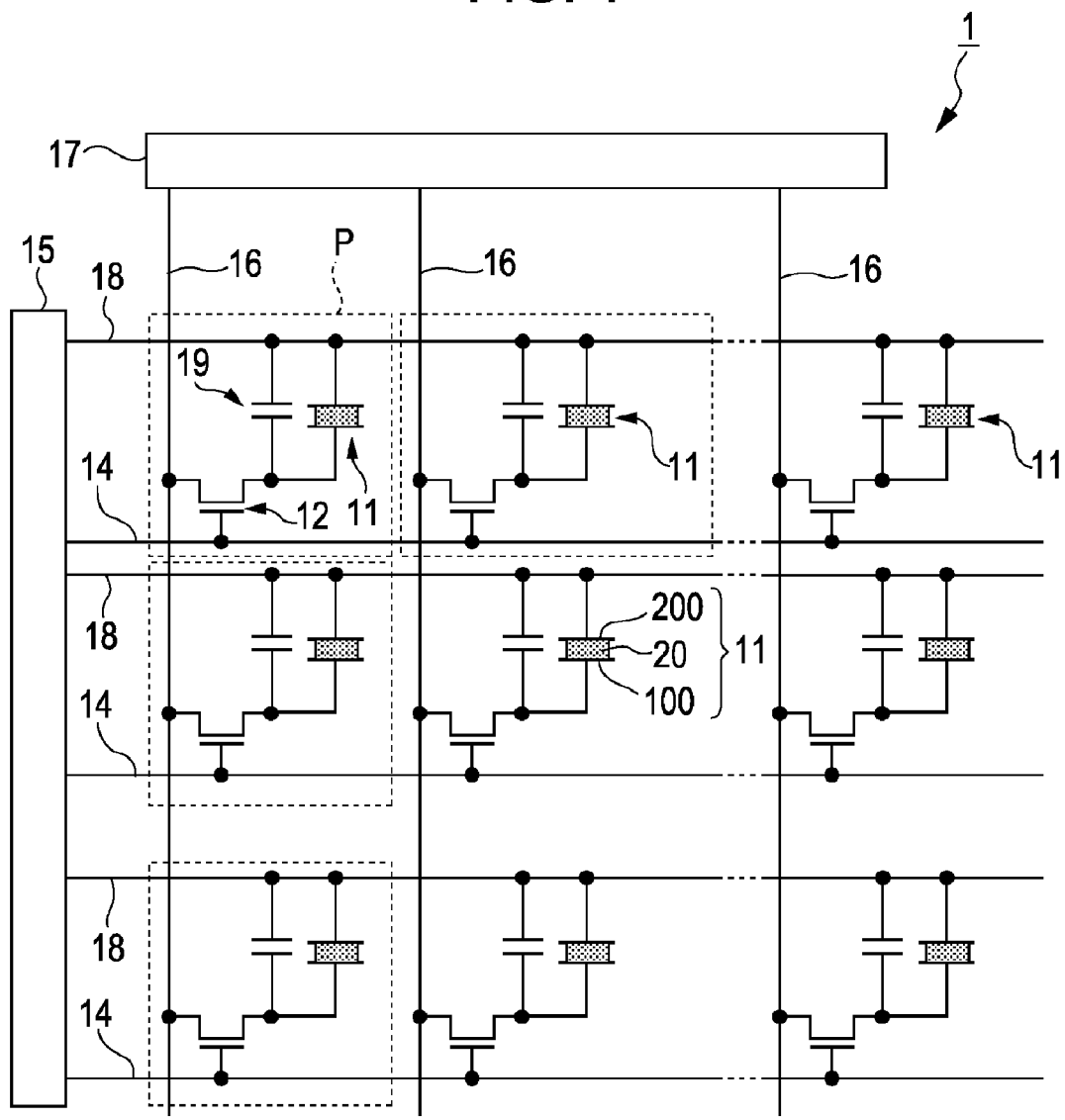
FIG. 1 is a block diagram showing a wiring structure of a liquid crystal display device according to a first embodiment of the invention.

First, the constitution of a liquid crystal display device 1 of the present embodiment will be described. FIG. 1 is a block diagram showing a wiring structure of the liquid crystal display device 1. The liquid crystal display device 1 includes scan lines 14 for supplying scan signals, signal lines 16 for supplying image signals, capacitive lines 18 which are arranged in parallel to the scan lines by the same number as the number of the scan lines, a scan line driving circuit 15 which is connected to the scan lines 14 for controlling the scan signals supplied to the scan lines 14, and a signal line driving circuit 17 which is connected to the signal lines 16 for controlling the image signals supplied to the signal lines 16.

The scan lines 14 intersect the signal lines 16 and the capacitive lines 18 and sub pixels P are formed on the intersections of the scan lines 14 and the signal lines 16. The plurality of sub pixels P are arranged in a matrix. Each of the sub pixels P includes a liquid crystal element 11, a driving thin-film transistor (TFT) 12 for controlling the driving of the liquid crystal element 11, and a storage capacitor 19 for stabilizing an image displayed by the liquid crystal element 11. The liquid crystal element 11 includes a pixel electrode 100, a common electrode 200 and a liquid crystal layer 20.

A gate portion of the driving TFT 12 included in each of the sub pixels P is connected to each of the scan lines 14, a source portion thereof is connected to each of the signal lines 16, and a drain portion thereof is connected to the pixel electrode 100 of the liquid crystal element 11. The storage capacitor 19 included in each of the sub pixels P is interposed between the drain of the driving TFT 12 and the capacitive line 18.

In the liquid crystal element 11 included in each of the sub pixels P, the pixel electrode 100 is connected to the drain of the driving TFT 12 and the common electrode 200 is connected to the capacitive line 18.

The scan line driving circuit 15 has a shift register and a level shifter and controls the scan lines 14. The signal line driving circuit 17 includes a shift register, a level shifter, a video line and an analog switch and controls the signal lines 16.

In the liquid crystal display device 1, when each of the scan signals is transmitted from the scan line driving circuit 15 to the driving TFT 12 via each of the scan lines 14, the driving TFT 12 is turned on. When the driving TFT 12 is turned on, a data signal supplied from each of the signal lines 16 is sent to the pixel electrode 100 via the driving TFT 12 and is held between the pixel electrode 100 and the common electrode 200. In the liquid crystal element 11, since the liquid crystal layer 20 is driven according to the potential of the data signal held between the electrodes so as to perform a display according to the data signal. Since the supplied data signal is supplied to the storage capacitor 19, the data signal is prevented from being leaked and the liquid crystal element 11 stably displays the image.

Figure 2:
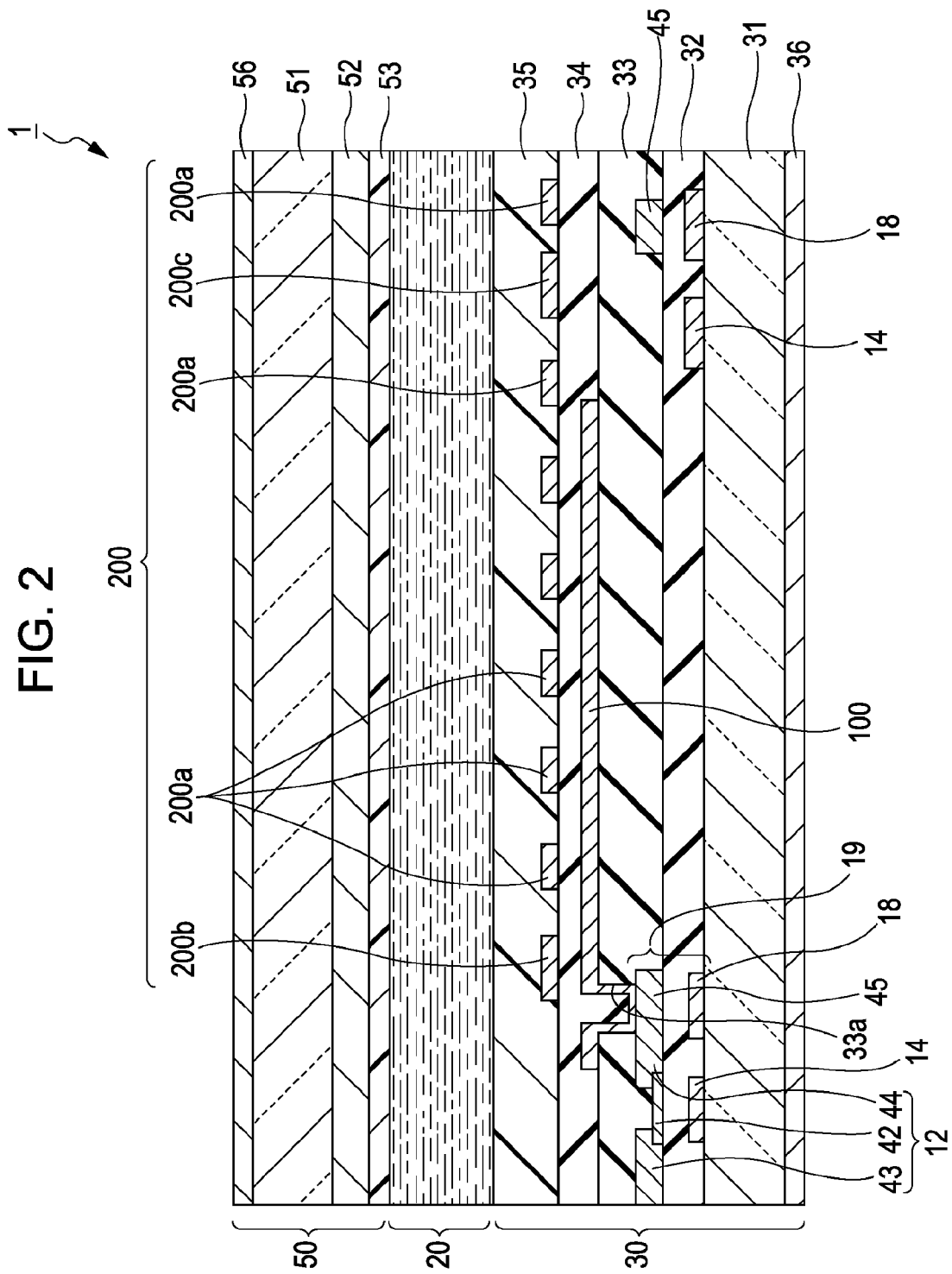
FIG. 2 is a partial cross-sectional view showing the liquid crystal display device according to the first embodiment of the invention.
Figure 3:
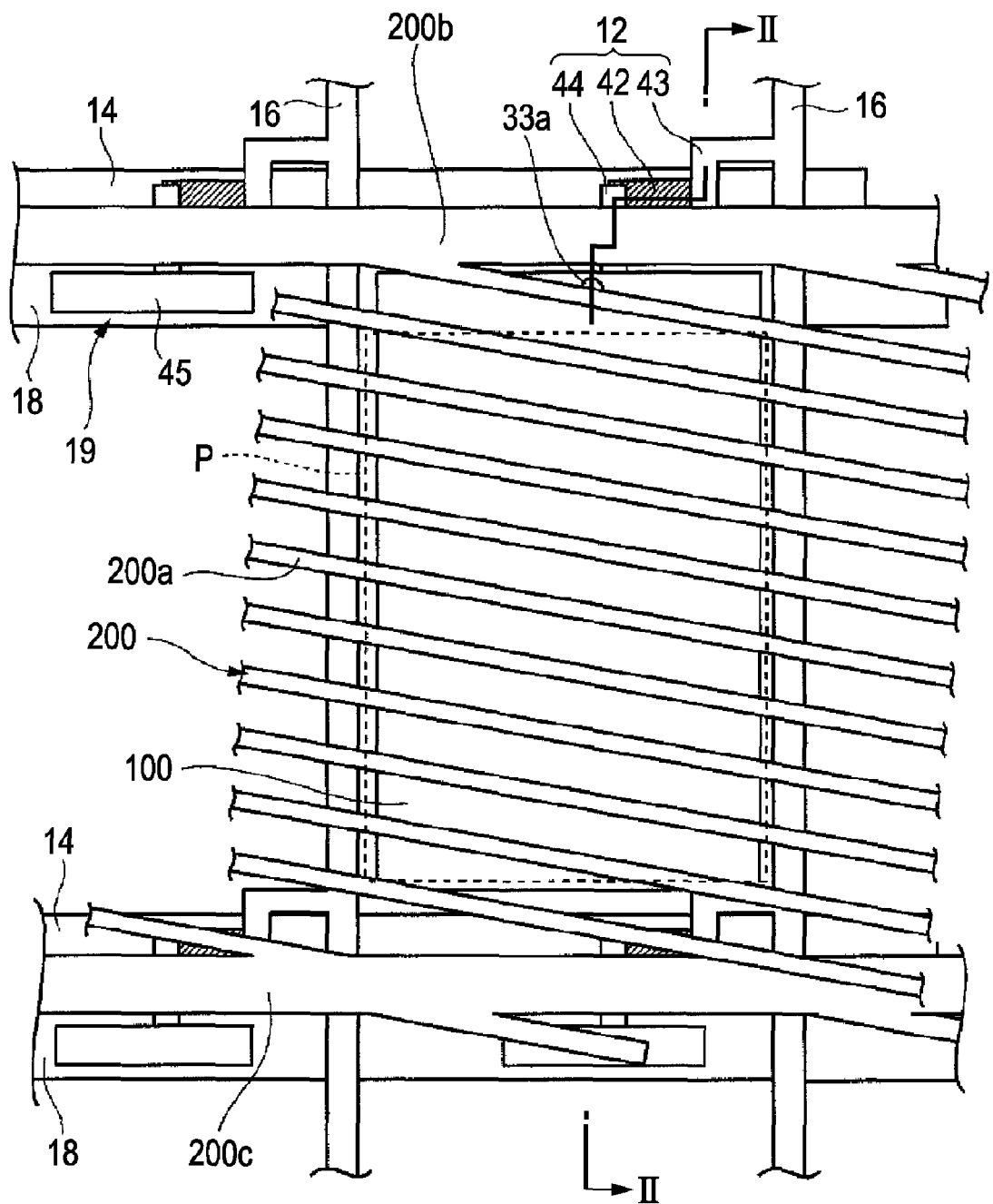
FIG. 3 is a partial plan view showing a sub pixel area of the liquid crystal display device according to the first embodiment of the invention.

Next, the detailed constitution of the liquid crystal display device 1 will be described with reference to FIGS. 2 and 3. FIG. 2 is a partial cross-sectional view of the liquid crystal display device and FIG. 3 is a partial plan view showing the sub pixel area of the liquid crystal display device. FIG. 2 is a cross-sectional view taken along line II-II of FIG. 3.

As shown in FIG. 2, the liquid crystal display device 1 includes a device substrate 30, a counter substrate 50 which faces the device substrate 30, and the liquid crystal layer 20 interposed between the device substrate 30 and the counter substrate 50. In the liquid crystal display device 1, a seal material (not shown) is provided along the edges of an area in which the device substrate 30 and the counter substrate 50 face each other and the liquid crystal layer 20 is sealed therein. In the liquid crystal display device 1, light is irradiated from the side of the device substrate 30.

The device substrate 30 has a substrate body 31 having light transmissivity. A material of the substrate body 31 includes, for example, an inorganic material such as glass, quartz glass or silicon nitride or an organic polymer (resin) such as acrylic resin or polycarbonate resin. If the substrate body has light transmissivity, the material may be a complex material by a lamination or a mixture of the above-described materials.

On the surface of the substrate body 31 on the side of the liquid crystal layer 20, the scan lines 14 and the capacitive lines 18 made of a conductive material such as aluminum or copper are formed in parallel to each other. The scan lines 14 and the capacitive lines 18 may be made of the same material or different materials. These lines may be formed by forming and patterning the conductive films such as aluminum.

In the invention, the term "parallel" indicates the state in which the lines extend so as not to intersect each other and includes mathematical parallel. However, the lines may not be strictly parallel to each other due to a manufacturing error and may be approximately parallel to each other. Hereinafter, the term "parallel" will be described in the same meaning.

On the substrate body 31, a gate insulating film 32 for covering the scan lines 14 and the capacitive lines 18 is formed. The gate insulating film 32 is made of a light transmissive material having insulation, such as silicon nitride or silicon oxide.

On the gate insulating film 32, a semiconductor layer 42, a source electrode 43 and a drain electrode 44 are formed. The driving TFT 12 is constituted by the semiconductor layer 42, the source electrode 43, the drain electrode 44 and the scan lines 14 formed on the substrate body 31. A capacitive electrode 45 is electrically connected to the drain electrode 44 and constitutes the storage capacitor 19 together with each of the capacitive lines 18.

The semiconductor layer 42 is made of semiconductor such as amorphous silicon. The source electrode 43 is branched from each of the signal lines 16 (not shown) formed on the same gate insulating film 32 and is connected to one end of the semiconductor layer 42. The drain electrode 44 is electrically connected to the capacitive electrode 45 and is connected to the other end of the semiconductor layer 42.

On the gate insulating film 32, an interlayer insulating film 33 is formed so as to cover the driving TFT 12, the capacitive electrode 45 and the signal lines 16 (not shown). The interlayer insulating film 33 is made of light transmissive material having insulation, such as silicon nitride or silicon oxide, similar to the gate insulating film 32. In a portion of the interlayer insulating film 33 overlapping with the capacitive electrode 45, a contact hole 33a which is a through-hole for electrically connecting the pixel electrode 100 and the driving TFT 12 is formed.

On the interlayer insulating film 33, the pixel electrode 100 according to the shape of each of the sub pixels P is formed and is electrically connected to the drain electrode 44 of the driving TFT 12 via the contact hole 33a. The pixel electrode 100 is made of a conductive material having light transmissivity, such as indium tin oxide (ITO). In the present embodiment, ITO is used.

On the interlayer insulating film 33, an inter-electrode insulating film 34 is formed so as to cover the pixel electrode 100. The inter-electrode insulating film 34 is made of a light transmissive material having insulation, such as silicon nitride or silicon oxide, similar to the gate insulating film 32 or the interlayer insulating film 33 and covers the pixel electrode 100 formed on the interlayer insulating film 33.

On the inter-electrode insulating film 34, the common electrode 200 is formed. The common electrode 200 includes first electrodes 200a, a second electrode 200b, and a third electrode 200c. The second electrode 200b is provided on one end of the first electrodes 200a arranged at a predetermined interval and the third electrode 200c is provided on the other end thereof. The inter-electrode insulating film 34 is interposed between the pixel electrode 100 and the common electrode 200. Accordingly, the pixel electrode 100 and the common electrode 200 constitute the FFS type electrode structure. The common electrode 200 is made of the conductive material having the light transmissivity, such as ITO and, in the present embodiment, ITO is used as the material of the common electrode 200. The common electrode may be obtained by forming and patterning the ITO film. The constitution of the common electrode 200 will be described in detail later.

On the inter-electrode insulating film 34, an alignment film 35 is formed so as to cover the common electrode 200. The alignment film 35 is made of, for example, an organic such as polyimide or an inorganic such as silicon oxide and aligns the liquid crystal molecules included in the liquid crystal layer 20 in a predetermined direction in a state in which the voltage is not applied. In the present embodiment, the alignment film 35 can be obtained by coating, drying curing a forming material such as polyimide and rubbing the surface of the material. For equalizing the rubbing, it is preferable that the direction of the rubbing process is a predetermined angle such as 2 degrees with respect to the extension direction of the first electrodes 200a. The direction of the rubbing process may be the extension direction of the second electrode 200b and the third electrode 200c.

The counter substrate 50 includes a substrate body 51 having light transmissivity. As the material for forming the substrate body 51, for example, an inorganic material such as glass, quartz glass or silicon nitride or an organic polymer (resin) such as acrylic resin or polycarbonate resin, similar to the substrate body 31. If the substrate body has light transmissivity, the material may be a complex material by a lamination or a mixture of the above-described materials.

On the surface of the substrate body 51 on the side of the liquid crystal layer 20, a color filter layer 52 is formed. The color filter layer 52 is provided in correspondence with the shape of each of the sub pixels P and contains color materials corresponding to display colors of the sub pixels.

On the color filter layer 52, an alignment film 53 is formed. The alignment film 53 is made of, for example, an organic material such as polyimide or an inorganic material such as silicon oxide and aligns the liquid crystal molecules included in the liquid crystal layer 20 in a predetermined direction in a state in which the voltage is not applied. In the present embodiment, the alignment film 53 can be obtained by coating, drying curing a forming material such as polyimide and rubbing the surface of the material. The alignment direction of the alignment film 53 by this rubbing process is equal to the alignment direction of the alignment film 35.

A polarization plate 36 is provided on the surface of the substrate body 31 opposite to the liquid crystal layer 20 and a polarization plate 56 is provided on the surface of the substrate body 51 opposite to the liquid crystal layer 20. The polarization plates 36 and 56 are provided such that the polarization axes thereof are orthogonal to each other.

Subsequently, the plane wiring structure in the vicinity of each of the sub pixels P of the liquid crystal display device 1 of the present embodiment will be described with reference to the plan view of FIG. 3. In FIG. 3, only the semiconductor layer and the lines on the device substrate 30 are displayed and the insulating films are omitted. The width or the size of each line is changed in order to recognize the size of each element.

As shown in the drawing, the scan lines 14 and the capacitive lines 18 are approximately formed in parallel and extend in the horizontal direction in the drawing. The signal lines 16 are formed to be orthogonal to the scan lines 14 and the capacitive lines 18. Accordingly, the scan lines 14, the signal lines 16 and the capacitive lines 18 are approximately formed in a lattice shape in plan view.

The source electrode 43 having an inverse L shape in plan view is branched from each of the signal lines 16 and is connected to one end of the semiconductor layer 42 which overlaps with each of the scan lines 14 in a plane. The drain electrode 44 is connected to the other end of the semiconductor layer 42 and forms the driving TFT 12. The drain electrode 44 is connected to the capacitive electrode 45 which overlaps with each of the capacitive lines 18 in a plane and forms the storage capacitor 19.

The common electrode 200 overlaps with each of the sub pixels P denoted by a dotted line in a plane and includes the plurality of first electrodes 200a which obliquely traverse each of the sub pixels P, the second electrode 200b disposed in an inter-pixel area which does not overlap with each of the sub pixels P, and the third electrode 200c disposed in the inter-pixel area which does not overlap with each of the sub pixels P. The common electrode 200 is formed on the whole surface of the display area in which the sub pixels P are formed. The first electrodes 200a overlap with at least two pixel electrodes 100 disposed in the plurality of sub pixels P.

The first electrodes 200a, the second electrode 200b and the third electrode 200c have band shapes and the plurality of first electrodes 200a are arranged in parallel at the same interval. The plurality of first electrodes 200a may be approximately parallel to each other and may not be strictly parallel to each other due to a manufacturing reason. The second electrode 200b and the third electrode 200c are parallel to each other and are approximately parallel to the scan lines 14 and the capacitive lines 18. The second electrode 200b and the third electrode 200c are approximately parallel to each other. An angle $\theta$ between the first electrodes 200a and the second electrode 200b and an angle $\theta$ between the first electrodes 200a and the third electrode 200c is 10 degrees.

Subsequently, FIG. 4 is a view showing the shape and the arrangement of the common electrode included in the liquid crystal display device 1 of the present embodiment. FIG. 4A is a wide plan view showing the plurality of pixels and FIG. 4B is an enlarged plan view showing only one pixel. For facilitating the description, in FIG. 4A, 1×5 pixels are shown and a portion of the first electrodes 200a is omitted. Here, each of the pixels G having a rectangular shape in plan view includes three sub pixels P having a rectangular shape per pixel in plan view and the sub pixels P display red, green and blue. Accordingly, in the drawing, 1×15 sub pixels are shown. In the drawing, "r", "g" and "b" denote the sub pixels for red, green and blue, respectively.

As shown in FIG. 4A, the pixels G are arranged in order of G1, G2, . . . and each of the pixels G includes the sub pixels P for displaying red, green and blue. The first electrode 200a included in the common electrode 200 of the present embodiment obliquely traverses 12 sub pixels P such that one ends of the first electrodes 200a are disposed on the left upper corner of all the sub pixels and the other ends of the first electrodes 200a are disposed on the right lower corner of all the sub pixels. For example, the other end of the first electrode 200a of which one end is disposed on the left upper corner of the sub pixel P1r included in the pixel G1 shown in the drawing is disposed on the right lower corner of the sub pixel P4b included in the pixel G4. The second electrode 200b and the third electrode 200c included in the common electrode 200 of the present embodiment overlap with the inter-pixel area which extends in the pixel arrangement direction, and are connected to the first electrodes 200a. In the present embodiment, the angle $\theta$ between the first electrodes 200a and the second electrode 200b and between the first electrodes 200a and the third electrode 200c is 10 degrees.

If the common electrode 200 has the above-described arrangement, as shown in FIG. 4B, the number of first electrodes 200a which traverse the sub pixels P included in the pixel G is identical. In the drawing, 12 first electrodes 200a traverse each of the sub pixels P so as to overlap with each other in a plane. Accordingly, since the liquid crystal can be driven on the basis of the electric fields having the same intensity between the sub pixels P, color unevenness between the sub pixels P can be suppressed. In addition, the size and the shapes of the portions of the first electrodes 200a which overlap with the sub pixels P in a plane are identical. Accordingly, since the liquid crystal can be driven by the electric field generated from the first electrodes 200a having the same shape even in any one of the sub pixels P, the color unevenness between the sub pixels P can be suppressed.

FIG. 5 is a schematic view showing the state of driving the liquid crystal molecules and a horizontal electric field direction in the vicinity of the connection between each of the first electrodes 200a and the second electrode 200b. Since the angle between each of the first electrodes 200a and the second electrode 200b is 10 degrees, an angle difference between the horizontal electric field E generated from each of the first electrodes 200a and the horizontal electric field E generated from the second electrode 200b is 10 degrees. Accordingly, the liquid crystal molecule 20a driven on the basis of the horizontal electric field E from the first electrode 200a and the liquid crystal molecule 20b driven on the basis of the horizontal electric field E from the second electrode 200b are aligned with an angle difference of 10 degrees. Since the angle difference of the alignment is as small as 10 degrees, a disclination degree is decreased. Accordingly, in the liquid crystal display panel 1 of the present embodiment including the common electrode having the above-described shape, a good display which is unlikely to be influenced by disclination can be realized.

Figure 6:
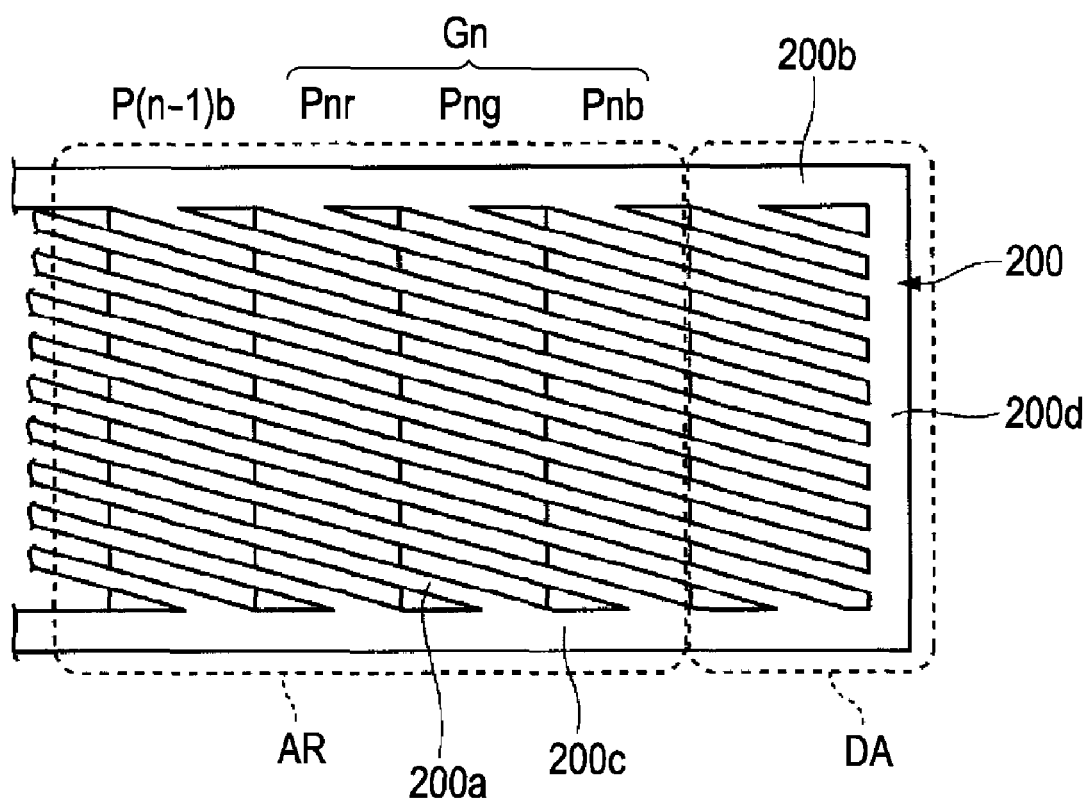
FIG. 6 is a partial plan view showing an end of the common electrode of the liquid crystal display device.

FIG. 6 is a plan view showing the shape of an end of the common electrode 200 of the present embodiment. Here, only one end of the common electrode 200 is shown. The common electrode 200 of the present embodiment includes a fourth electrode 200d connecting the ends of the second electrode 200b and the third electrode 200c. The fourth electrode 200d is connected to the other ends of the plurality of first electrodes 200a. In the other end (not shown) of the common electrode 200, the fourth electrode 200d connects the ends of the second electrode 200b and the third electrode 200c and the fourth electrode 200d is connected to one ends of the plurality of first electrodes 200a. Accordingly, the common electrode 200 of the present embodiment has a rectangular frame in plan view by connecting the second electrode 200b, the third electrode 200c and the pair of fourth electrodes 200d, and the plurality of first electrodes 200a are disposed in the frame. In the present embodiment, the fourth electrode 200d is made of ITO.

In the vicinities of the connections between the fourth electrode 200d, and the first electrodes 200a, the second electrode 200b and the third electrode 200c, disclination is generated because the horizontal electric field directions generated from the electrodes are different from each other. However, in the present embodiment, the common electrode 200 extends to an external area DA of a display area AR and the fourth electrode 200d is disposed in the external area DA. The disclination generated in the vicinities of the connections between the fourth electrode 200d and the electrodes is generated in the external area DA of the display area and does not have an influence on the display. The width of the external area DA can include an area in which disclination is generated and is not specially limited if the display is not influenced. Although the fourth electrode 200d has a rectangular band shape in plan view, the shape of the fourth electrode 200d is not specially limited if the fourth electrode is disposed in the external area DA. In the liquid crystal display panel 1 of the present embodiment, the influence of declination can be reduced and a good display can be realized even in the end of the display area AR.

According to the liquid crystal display device 1 having the above-described constitution, the first electrodes 200a extend so as to obliquely intersect the second electrode 200b and the third electrode 200c which extend in the pixel arrangement direction. Accordingly, the direction of the horizontal electric field generated from the second electrode 200b or the third electrode 200c obliquely intersects the direction of the horizontal electric field generated from the first electrodes 200a. Accordingly, a horizontal electric filed difference of 90 degrees in which disclination generated due to the difference between the electric field directions becomes a maximum can be avoided and the liquid crystal display device 1 in which the influence of disclination is reduced can be obtained. In addition, since the first electrodes 200a are connected to the second electrode 200b and the third electrode 200c so as to form the common electrode 200, a voltage signal can be delivered via a short path. Accordingly, a response timing difference can be decreased and the liquid crystal display device 1 which flicker or crosstalk is reduced can be obtained.

In the present embodiment, the plurality of first electrodes 200a are disposed in parallel to each other at the predetermined interval. Since the interval between the adjacent first electrodes 200a is not changed and is uniform, the intensity of the electric field spread between the electrodes is not changed and the horizontal electric field having the uniform intensity can be generated in the vicinities of the first electrodes 200a. Accordingly, the unevenness in the driving of the liquid crystal molecules is not eliminated and the high-quality liquid crystal display device 1 can be obtained.

In the present embodiment, the second electrode 200b and the third electrode 200c are disposed so as to overlap with the inter-pixel area which extends in the pixel arrangement axis direction in a plane. Accordingly, the intersections between the first electrodes 200a and the second electrode 200b and the intersections between the first electrodes 200a and the third electrode 200c are disposed on the end of the pixel G. Accordingly, the point in which disclination is generated becomes the end of the pixel G for performing the display and the central portion of the pixel G can perform the good display. Accordingly, it is possible to obtain the liquid crystal display device 1 in which the influence of disclination on image quality is reduced.

In the present embodiment, the second electrode 200b and the third electrode 200c are disposed in the adjacent inter-pixel area. Accordingly, since the pixels are disposed with the second electrode 200b and the third electrode 200c interposed therebetween, disclination is generated between the rows of the pixels. Accordingly, a difference between the rows can be eliminated and the liquid crystal display device 1 which can realize a good display while suppressing color unevenness can be obtained.

In the present embodiment, the pixel G has the plurality of sub pixels P having the same shape and the interval between the ends of the adjacent first electrodes 200a in the arrangement axis direction is equal to the width of each of the sub pixels in the arrangement axis direction. Accordingly, in all the sub pixels P, since the number of first electrodes 200a traversing the sub pixels P is identical, the intensity of the horizontal electric field generated on the basis of the first electrodes 200a in all the sub pixels P is identical. Accordingly, the liquid crystal molecules 20a can be driven on the basis of the horizontal electric fields having the same intensity between the sub pixels P and the liquid crystal display device 1 which can realize a good display without color unevenness can be obtained.

In the present embodiment, the angle between the first electrodes 200a and the second electrode 200b and the angle between the first electrodes 200a and the third electrode 200c is 10 degrees. By using the common electrode 200 having the above-described angle, disclination is more efficiently reduced and the liquid crystal display device 1 with improved light transmissivity can be obtained.

In the present embodiment, the first electrodes 200a, the second electrode 200b and the third electrode 200c are connected to the fourth electrode 200d in the external area DA of the display area AR. Disclination generated in the connections between the electrodes and the fourth electrode 200d is generated in the external area DA which does not have an influence on the display. Accordingly, it is possible to provide the liquid crystal display device 1 which can realize a high-quality display.

Although, in the present embodiment, the common electrode 200 is made of ITO, the first electrodes 200a included in the common electrode 200 may be made of ITO and the second electrode 200b and the third electrode 200c may be made of the conductive material, such as copper, of which the efficiency is lower than ITO of the first electrode 200a. By forming the second electrode 200b or the third electrode 200c using a low-resistance material, the overall resistance of the common electrode 200 can be reduced and the liquid crystal display device in which flicker or crosstalk is reduced can be obtained. In the case where the low-resistance conductive material for forming the second electrode 200b and the third electrode 200c does not have light transmissivity, it is preferable that the second electrode 200b and the third electrode 200c are disposed so as to overlap with the inter-pixel area or a black matrix in a plane and so as not to overlap with the display area.

Second Embodiment

Figure 7:
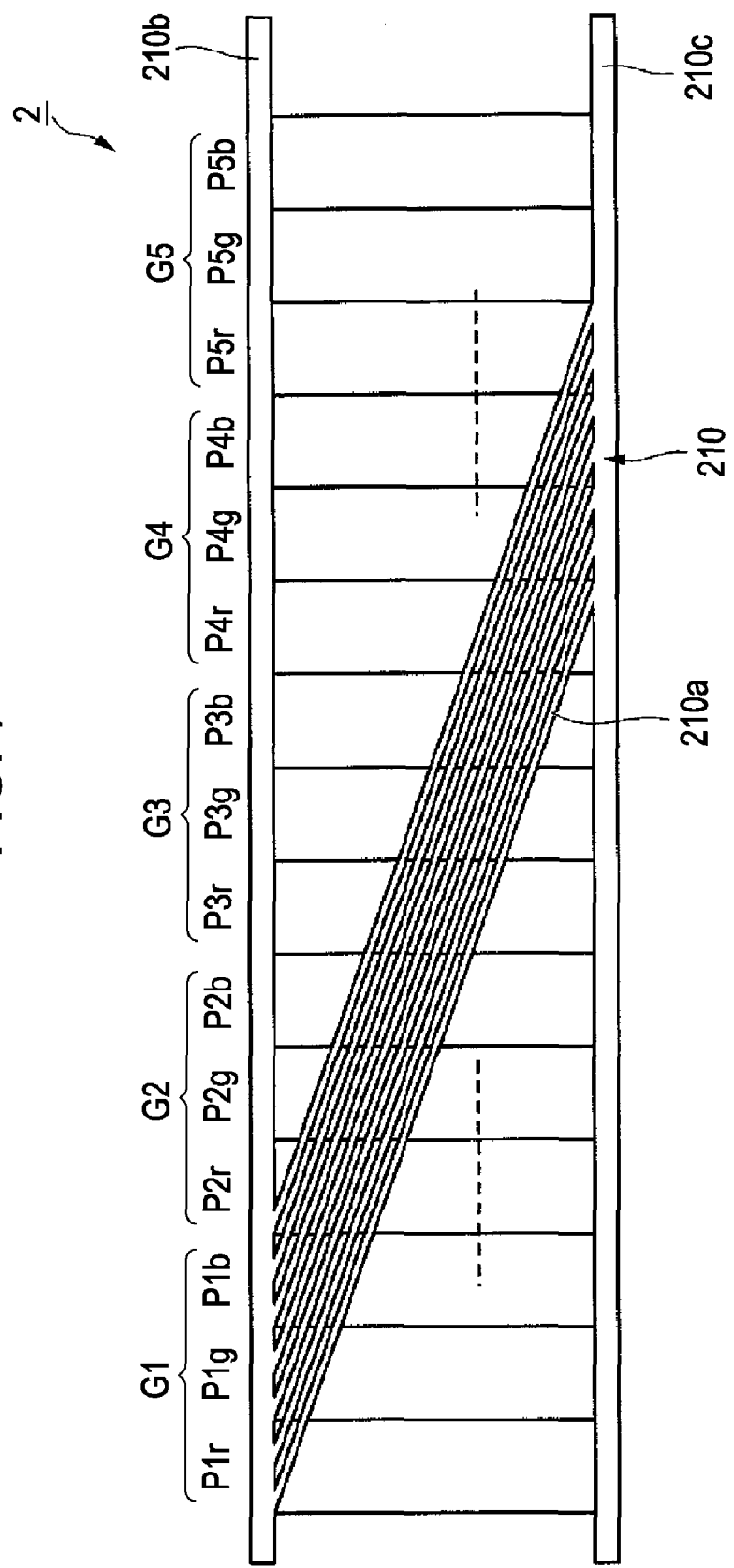
FIG. 7 is a view showing the shape and the arrangement of a common electrode of a liquid crystal display device according to a second embodiment of the invention.

FIG. 7 is a view showing an image display device 2 according to a second embodiment of the invention. The liquid crystal display device of the present embodiment is partially similar to the liquid crystal display device 1 of the first embodiment and is different from the first embodiment in that the pitch between the first electrodes included in the common electrode is a half of that of the first embodiment and the number of first electrodes is twice of that of the first embodiment. Accordingly, the same components as the first embodiment are denoted by the same reference numerals and thus the detailed description thereof will be omitted.

FIG. 7 is a view showing the shape and the arrangement of the common electrode of the liquid crystal display device 2 of the present embodiment. In first electrodes 210a included in a common electrode 210 of the present embodiment, one ends of the first electrodes 210a are disposed on the midpoint of the side which extends in the arrangement direction of the sub pixels and the left upper corner of the sub pixels and the other ends of the first electrodes 210a are disposed on the midpoint of the side which extends in the arrangement direction of the sub pixels and the right lower corner of the sub pixels. In other words, the interval between one ends of the adjacent first electrodes 210a is equal to the width of a half (½) of the width of the side which extends in the arrangement direction of the sub pixels. Since the first electrodes 210a are disposed in parallel to each other, the interval between the other ends of the adjacent first electrodes 210a is equal to the width of a half of the width of the side which extends in the arrangement direction of the sub pixels.

In addition, the first electrode 210a obliquely traverses 12 sub pixels P such that the other end of the first electrode 210a, of which one end is disposed on the left upper corner of the sub pixel P1r included in the pixel G1, is disposed on the right lower corner of the sub pixel P4b included in the pixel G4. A second electrode 210b and a third electrode 210c included in the common electrode 210 of the present embodiment overlap with the inter-pixel area which extends in the pixel arrangement direction, and are connected to the plurality of first electrodes 210a. In the present embodiment, the angle θ between the first electrodes 210a and the second electrode 210b and between the first electrodes 210a and the third electrode 210c is 10 degrees.

According to the liquid crystal display device 2 having the above-described constitution, the plurality of first electrodes 200a can be disposed and a horizontal electric field from the first electrodes 200a can be generated at a minute interval. Accordingly, it is possible to drive the liquid crystal with high precision and obtain a high-quality liquid crystal display device.

Third Embodiment

FIG. 8 is a view showing an image display device 3 according to a third embodiment of the invention. The liquid crystal display device of the present embodiment is partially similar to the liquid crystal display device 1 of the first embodiment and is different from the first embodiment in that the number of first electrodes included in the common electrode is reduced and one ends or the other ends of the first electrodes are not disposed in all the sub pixels. Accordingly, the same components as the first embodiment are denoted by the same reference numerals and thus the detailed description thereof will be omitted.

In the ideal arrangement of the first electrodes, as shown in the first embodiment or the second embodiment, the shapes of the first electrodes which overlap with the sub pixels P in a plane are identical in all the sub pixels P and the number of first electrodes which traverse the sub pixels P is identical in all the sub pixels P. If this common electrode is disposed, since the intensity of the generated horizontal electric field is identical between the sub pixels, it is possible to obtain stable driving and uniform display quality. Accordingly, although one ends or the other ends of the first electrodes are not disposed in all the sub pixels, it is possible to obtain the liquid crystal display device 3 which can display a high-quality image, by such arrangement of the first electrodes.

FIG. 8 is a view showing the shape and the arrangement of the common electrode included in the liquid crystal display device of the present embodiment. First, FIG. 8A shows an arrangement example in which one ends of the first electrodes 220a included in the common electrode 220 of the present embodiment are disposed on the second electrode 220b in every two sub pixels, the first electrodes 220a traverse 13 sub pixels, and the other ends of the first electrodes are connected to the third electrode 220c. The angle θ between the first electrodes 220a and the second electrode 220b and between the first electrodes 220a and the third electrode 220c is 8 degrees. Accordingly, it is possible to suppress the influence of disclination in the vicinities of one ends and the other ends of the first electrodes 220a.

In this case, for example, in the pixel G2, six first electrodes 220a traverses the sub pixels P2r and P2b, but seven first electrodes traverse the sub pixel P2g. That is, the number of first electrodes 220a which traverse the sub pixels for displaying different colors varies. In the sub pixel for displaying red, for example, six first electrodes 220a traverse the sub pixel P2r, but seven first electrodes 220a traverse the sub pixel P3r. That is, the number of first electrodes 220a which traverse the sub pixels for displaying the same color varies. In the liquid crystal display device 3 including the common electrode 220 having the above-described arrangement, since the sub pixels are different in the intensity of the generated electric field, the state of driving the liquid crystal molecules varies and color unevenness remains.

Next, FIG. 8B shows an arrangement example in which one ends of the first electrodes 220a are disposed on the second electrode 220b in every three sub pixels, the first electrodes 220a traverse 10 sub pixels, and the other ends of the first electrodes are connected to the third electrode 220c. The angle θ between the first electrodes 220a and the second electrode 220b and between the first electrodes 220a and the third electrode 220c is 13 degrees. Accordingly, it is possible to suppress the influence of disclination in the vicinities of one ends and the other ends of the first electrodes 220a.

In this case, for example, in the pixel G2, four first electrodes 220a traverses the sub pixels P2r, but three first electrodes traverse the sub pixels P2g and P2b. That is, the number of first electrodes 220a which traverse the sub pixels for displaying different colors varies. In the sub pixel P for displaying red, for example, four first electrodes 220a traverse all the sub pixels for displaying red, and the number of first electrodes 220a which traverse the sub pixels for displaying the same color is identical. Even in the sub pixels P for displaying green and blue, the number of first electrodes 220a which traverse the sub pixels for displaying the same color is identical. In the liquid crystal display device 4 including the common electrode 220 having the above-described arrangement, since the sub pixels for displaying the same color are identical in the intensity of the electric field and the sub pixels for displaying different colors are different in the intensity of the generated electric field, the state of driving the liquid crystal molecules varies and color unevenness between the sub pixels P for displaying the different colors remains.

Next, FIG. 8C shows an arrangement example in which one ends of the first electrodes 220a are disposed on the second electrode 220b in every two sub pixels, the first electrodes 220a traverse 12 sub pixels, and the other ends of the first electrodes are connected to the third electrode 220c. The number of sub pixels which the first electrodes 220a traverse is four times of the number of sub pixels P constituting one pixel G. The angle θ between the first electrodes 220a and the second electrode 220b and between the first electrodes 220a and the third electrode 220c is 10 degrees. Accordingly, it is possible to suppress the influence of disclination in the vicinities of one ends and the other ends of the first electrodes 220a.

In this case, for example, in the pixel G2, six first electrodes 220a traverses any one of the sub pixels P, that is, the number of first electrodes 220a which traverse the sub pixels for displaying different colors is identical. In the sub pixel P for displaying red, for example, one end of the first electrode 220a is disposed in the sub pixel P2r, but is not disposed in the sub pixel P3r. The other end of the first electrode 220a is disposed in the sub pixel P2r, but is not disposed in the sub pixel P3r. Accordingly, the sub pixels P for displaying the same color are different in a method of overlapping the first electrode 220a. The same is true in the sub pixels P for displaying green and blue. As described above, the alignment of the liquid crystal molecules varies in the vicinities of one ends and the other ends of the first electrodes 220a such that disclination is generated. However, since the arrangement of one ends and the other ends of the first electrodes 220a is not uniform between the sub pixels P for displaying the same color, a position where declination is generated is not uniform and color unevenness is caused. Accordingly, in the liquid crystal display device 5 including the common electrode 220 having the above-described arrangement, although the sub pixels P for displaying the different colors are identical in the intensity of the electric field, color unevenness between the sub pixels P for displaying the same color remains.

Next, FIG. 8D shows an arrangement example in which one ends of the first electrodes 220a are disposed on the second electrode 220b in every three sub pixels, the first electrodes 220a traverse 12 sub pixels, and the other ends of the first electrodes are connected to the third electrode 220c. The number of sub pixels which the first electrodes 220a traverse is four times of the number of sub pixels P constituting one pixel G. The angle θ between the first electrodes 220a and the second electrode 220b and between the first electrodes 220a and the third electrode 220c is 10 degrees. Accordingly, it is possible to suppress the influence of disclination in the vicinities of one ends and the other ends of the first electrodes 220a.

In this case, for example, in the pixel G2, four first electrodes 220a traverses any one of the sub pixels P, that is, the number of first electrodes 220a which traverse the sub pixels for displaying different colors is identical. In the sub pixel P for displaying red, for example, one ends of the first electrodes connected to the second electrode 220b are disposed in all the sub pixels P for displaying red. Similarly, in the sub pixel P for displaying green, one ends or the other ends of the first electrodes 220a are not disposed in the sub pixels for displaying green and the other ends of the first electrodes are disposed in the sub pixel P for displaying blue. In other words, the arrangement of one ends and the other ends of the first electrodes 220a between the sub pixels P for displaying the same color is constant and a position where disclination is generated is constant. Accordingly, in the liquid crystal display device 6 including the common electrode 220 having the above-described arrangement, since the intensity of the electric field between the sub pixels P for displaying the different colors is constant and the common electrode 220 is disposed with the same pattern between the sub pixel P for displaying the same color, color unevenness is not caused. Accordingly, it is possible to obtain a liquid crystal display device which can realize a good display.

Fourth Embodiment

Figure 9:
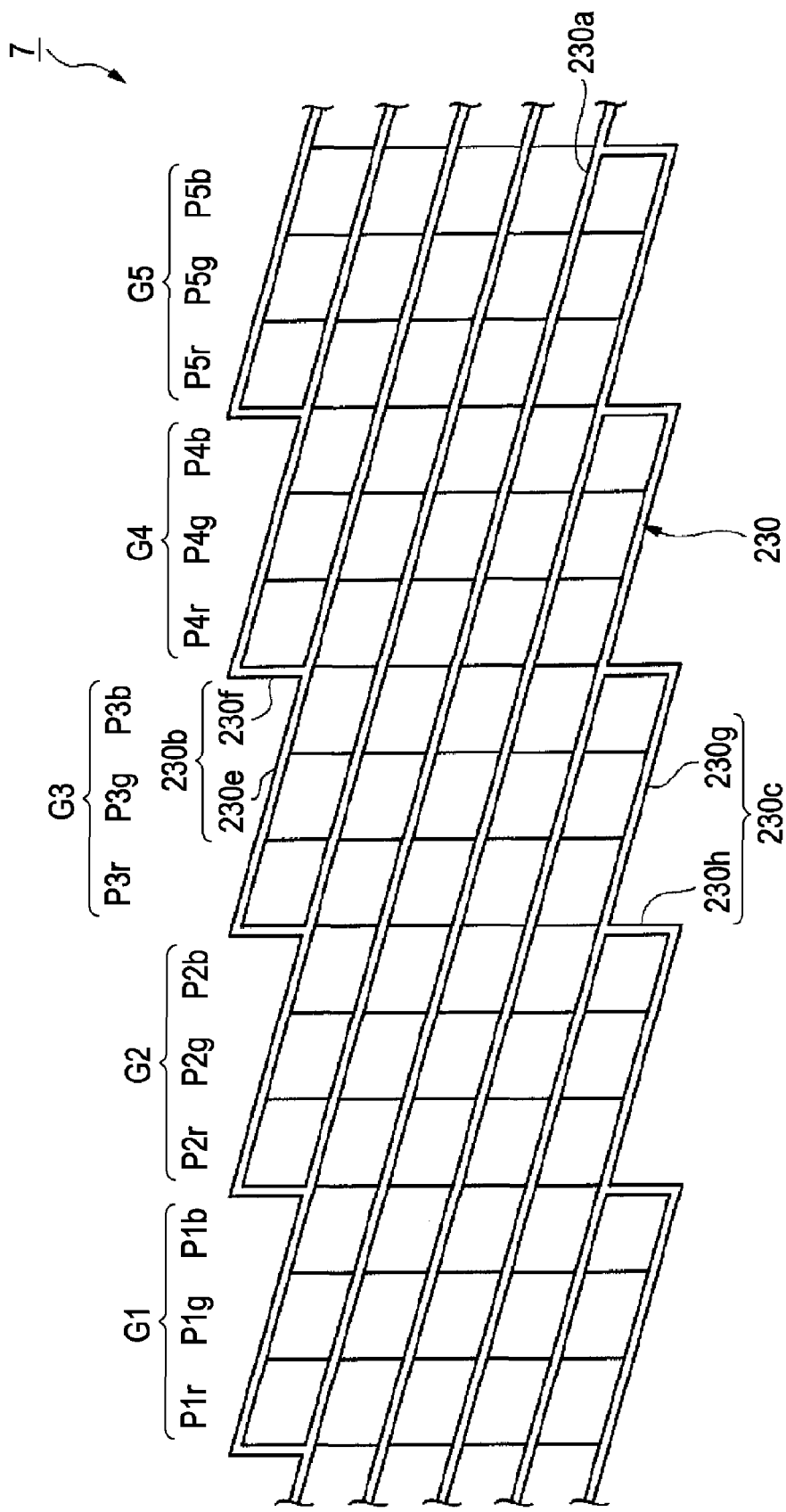
FIG. 9 is a view showing the shape and the arrangement of a common electrode of a liquid crystal display device according to a fourth embodiment of the invention.

FIG. 9 is a view showing an image display device 7 according to a fourth embodiment of the invention. The liquid crystal display device of the present embodiment is partially similar to the liquid crystal display device of the third embodiment. Accordingly, the same components as the third embodiment are denoted by the same reference numerals and thus the detailed description thereof will be omitted.

In the liquid crystal display device 7 of the present embodiment, the shape of the pixel G has approximately a parallelogram in plan view and extends in the pixel arrangement axis direction. The inter-pixel area which extends in the arrangement axis direction has a saw-like shape in plan view, instead of a straight line shape.

In first electrodes 230a included in a common electrode 230 of the present embodiment are disposed in parallel to an oblique side of the pixel G which extends in the pixel arrangement axis direction. A second electrode 230b includes main lines 230e which are disposed in parallel to the first electrodes 230a and the oblique side of the pixel G and connection portions 230f which extend in a direction orthogonal to the pixel arrangement axis (an extension direction of a vertical side of the pixel G) and connect the adjacent main lines 230e. Similarly, a third electrode 230c includes main lines 230g which are disposed in parallel to the first electrodes 230a and the oblique side of the pixel G and connection portions 230h which extend in the direction orthogonal to the pixel arrangement axis and connect the adjacent main lines 230g. One ends of the first electrodes 230a are disposed on the connections between the main lines 230e and the connection portions 230f of the second electrode 230b. The other ends of the first electrodes 230a are disposed on the connections between the main lines 230g and the connection portions 230h of the third electrode 230c.

According to the liquid crystal display device 7, all the shapes of the first electrodes 230a overlapping with the sub pixels P included in the pixel G are identical. Accordingly, the intensities of the horizontal electric fields of the sub pixels P are equalized and the liquid crystal display device which can realize an excellent display while suppressing color unevenness.

Although, in the present embodiment, one ends of the first electrodes 230a are disposed on the connections between the main lines 230e and the connection portions 230f of the second electrode 230b, they may be disposed on any positions of the connection portions 230f. The same is true in the other ends of the first electrodes 230a.

Although, in the present embodiment, one ends of the first electrodes 230a are disposed on the connection portions 230f of the second electrode 230b one by one, a plurality of ends may be disposed. In this case, the interval between the first electrodes 230a narrows and the horizontal electric field from the first electrodes 230a can be generated with a minute interval. Accordingly, since the electric field and the control of the liquid crystal molecules are efficiently facilitated in the overall display area, it is possible to provide a liquid crystal display device which can realize a high-quality display.

Electronic Apparatus

Figure 10:
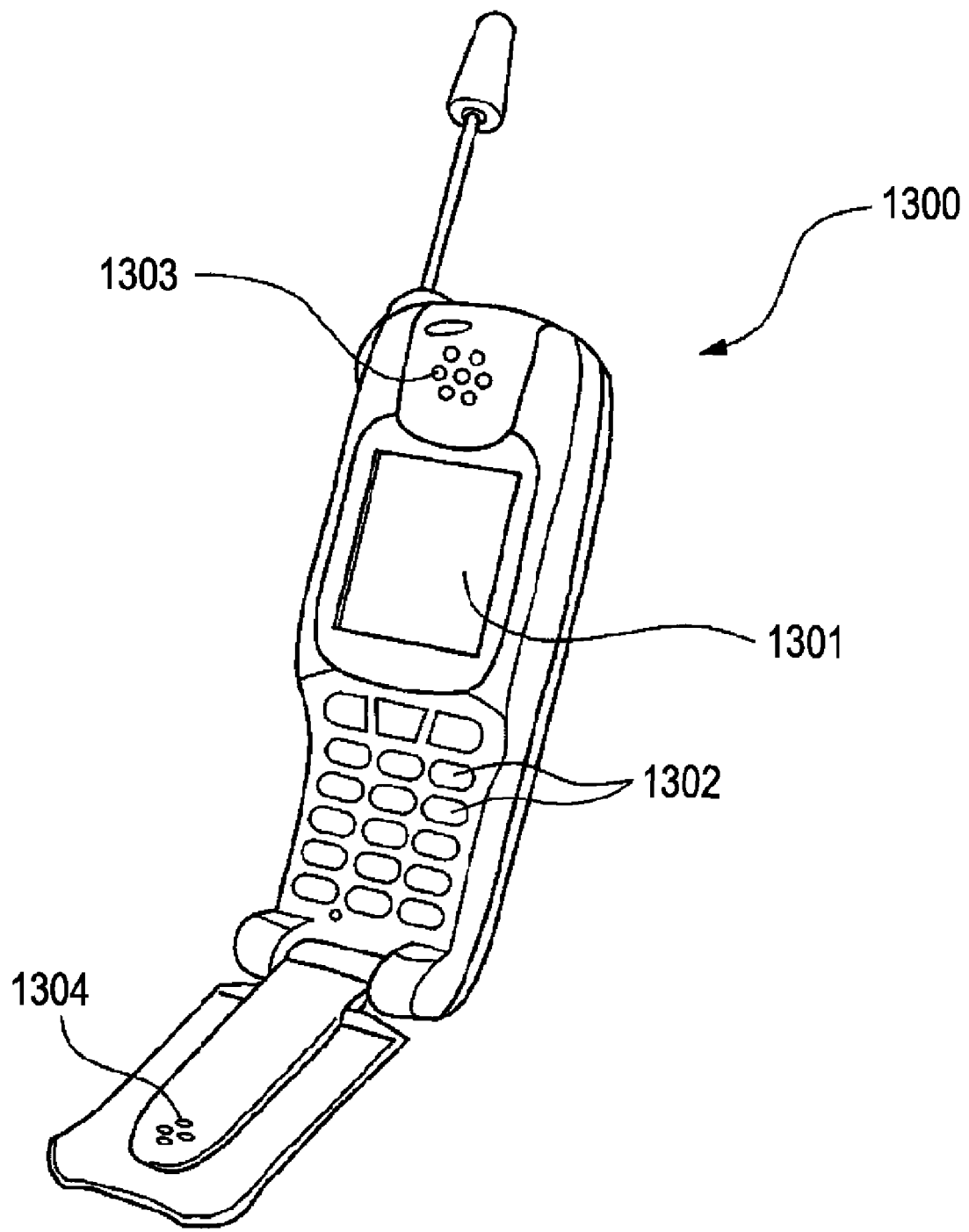
FIG. 10 is a perspective view showing an example of an electronic apparatus according to the invention.
Figure 11A:
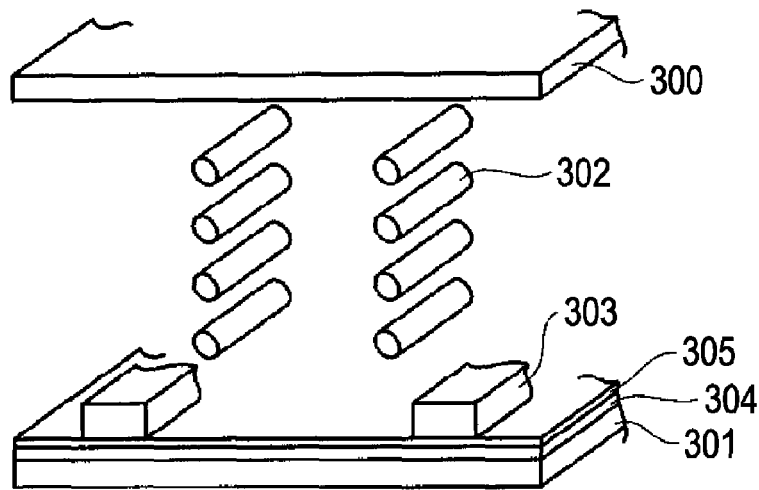
FIG. 11 is a schematic view showing a FFS type driving method.
Figure 11B:
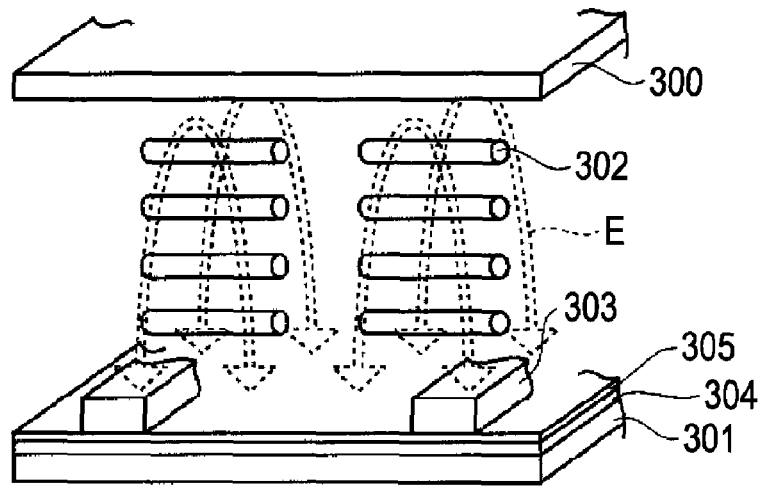
Figure 12:
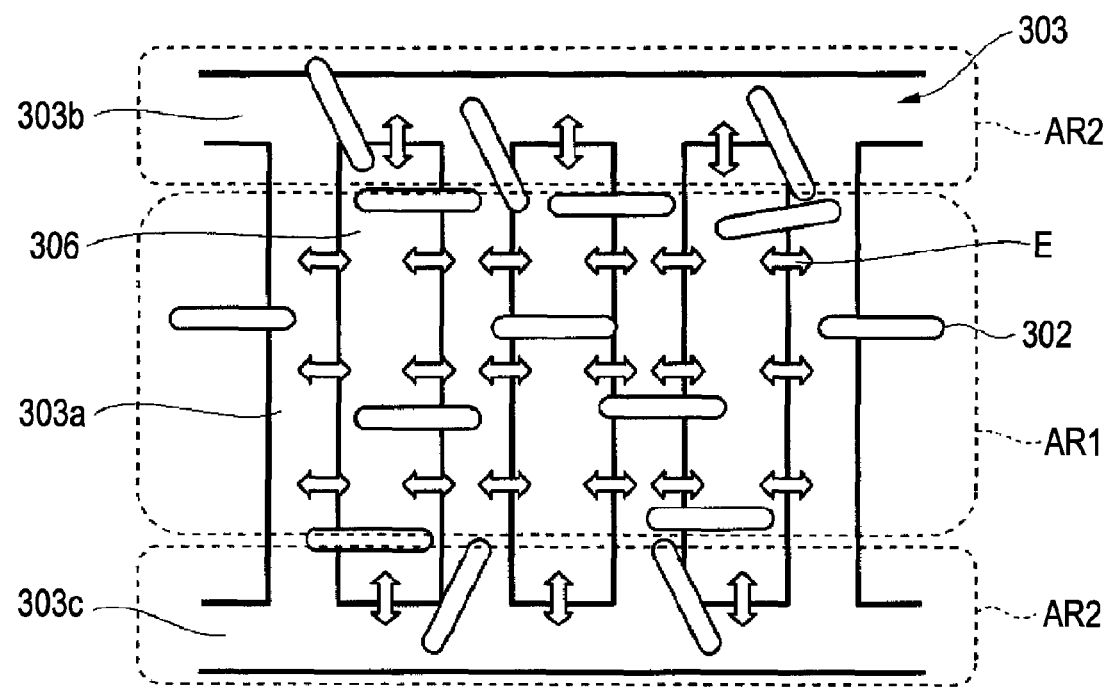
FIG. 12 is a plan view showing a general example of the shape of an electrode related to a FFS type liquid crystal display device.

Next, an electronic apparatus of an embodiment of the invention will be described. FIG. 10 is a perspective view showing an example of the electronic apparatus of the invention. A mobile phone 1300 shown in FIG. 10 includes the liquid crystal display device of the invention as a small-sized display unit 1301, a plurality of manipulation buttons 1302, an ear piece 1303 and a mouth piece 1304. Accordingly, it is possible to provide the mobile phone 1300 including the display unit having excellent display quality, which is constituted by the liquid crystal display device of the invention.

The liquid crystal display devices of the embodiment are applicable to an electronic book, a projector, a personal computer (PC), a digital still camera, a television receiver, a viewfinder-type or direct-view monitor type video tape recorder, a car navigation system, a pager, an electronic organizer, an electronic calculator, a word processor, a workstation, a videophone, a POS terminal, a touch-panel-equipped device as an image display unit, in addition to the mobile phone. By this constitution, it is possible to provide an electronic apparatus including the liquid crystal display unit with high reliability and high display quality.

Although the embodiments of the invention are described with reference to the accompanying drawings, the invention is not limited to the embodiments. In the above-described embodiments, the shapes of components or a combination of components is only exemplary and the invention may be variously modified on the basis of a design requirement without departing from the scope of the invention.

The entire disclosure of Japanese Application No. 2005-02496, filed Sep. 28, 2007 is expressly incorporated by reference herein.

What is claimed is:

1. A liquid crystal display device comprising:
a pair of substrates having a liquid crystal layer interposed therebetween;
a plurality of pixels which is provided along a predetermined arrangement axis and constitutes a display area;
a plurality of sub pixels constituting the pixels;
a plurality of pixel electrodes which are disposed on one of the pair of substrates and are provided in correspondence with the plurality of sub pixels;
an insulating film which is provided on the plurality of pixel electrodes; and
a common electrode which is provided on the insulating film, the common electrode including:
a plurality of first electrodes which extend in a direction obliquely intersecting the arrangement axis and each of the first electrodes extending across a plurality of the sub pixels, the plurality of first electrodes overlapping with the plurality of pixel electrodes in an area of the plurality of sub pixels,
a second electrode which has a portion obliquely intersecting the plurality of first electrodes and connects one ends of the plurality of first electrodes, and
a third electrode which has a portion obliquely intersecting the plurality of first electrodes and connects the other ends of the plurality of first electrodes, wherein:
in the display area, pixels of one column which are provided along the predetermined arrangement axis are provided in a plurality of numbers in a direction orthogonal to the arrangement axis, and
the second electrode and the third electrode are disposed so as to overlap with inter-pixel areas, which extend in the direction of the arrangement axis, in a plane, and
wherein the second electrode and the third electrode are disposed in the adjacent inter-pixel areas in a direction orthogonal to the arrangement axis.

2. The liquid crystal display device according to claim 1, wherein the plurality of first electrodes are at least partially arranged in parallel to each other at a predetermined interval.

3. The liquid crystal display device according to claim 1, wherein the plurality of first electrodes are at least partially arranged in parallel to each other at a predetermined interval.

4. The liquid crystal display device according to claim 3, wherein the interval between one ends of the adjacent first electrodes in the arrangement axis direction is at least partially equal to the width of each of the pixels in the arrangement axis direction.

5. The liquid crystal display device according to claim 4, wherein:
each of the pixels includes a parallelogram including a vertical side portion which extends in a direction orthogonal to the arrangement axis and an oblique side portion which extends in a direction obliquely intersecting the vertical side portion,
the plurality of first electrodes extend in parallel to the oblique side portion,
the second electrode includes a plurality of main lines which extend in parallel to the oblique side portion and connecting portions which extend in parallel to the vertical side portion and connect the plurality of main lines, and
the third electrode includes a plurality of main lines which extend in parallel to the oblique side portion and connecting portions which extend in parallel to the vertical side portion and connect the plurality of main lines.

6. The liquid crystal display device according to claim 5, wherein one ends of the plurality of first electrodes are disposed on the connecting portions.

7. The liquid crystal display device according to claim 4, wherein the interval between one ends and the other ends of the first electrodes in the arrangement axis direction is a multiple of the width of the pixel in the arrangement axis direction.

8. The liquid crystal display device according to claim 3, wherein:
the sub pixels have the same shape, and
the interval between one ends of the adjacent first electrodes in the arrangement axis direction is equal to the width of the sub pixels in the arrangement axis direction.

9. The liquid crystal display device according to claim 3, wherein:
the sub pixels have the same shape, and
the interval between one ends of the adjacent first electrodes in the arrangement axis direction is equal to the width of integral submultiple of the width of the sub pixels in the arrangement axis direction.

10. The liquid crystal display device according to claim 1, wherein one or both of an angle between the first electrodes and the second electrode and an angle between the first electrodes and the third electrode is 1 degree to 15 degrees.

11. The liquid crystal display device according to claim 1, wherein the second electrode and the third electrode are formed of a conductive material having a lower resistivity than that of the first electrodes.

12. An electronic apparatus comprising the liquid crystal display device according to claim 1.

13. A liquid crystal display device comprising:
a pair of substrates having a liquid crystal layer interposed therebetween;
a plurality of pixels which is provided along a predetermined arrangement axis and constitutes a display area;
a plurality of sub pixels constituting the pixels;
a plurality of pixel electrodes which are disposed on one of the pair of substrates and are provided in correspondence with the plurality of sub pixels;
an insulating film which is provided on the plurality of pixel electrodes; and
a common electrode which is provided on the insulating film, the common electrode including:
a plurality of first electrodes which extend in a direction obliquely intersecting the arrangement axis and each of the first electrodes extending across a plurality of the sub pixels, the plurality of first electrodes overlapping with the plurality of pixel electrodes in an area of the plurality of sub pixels,
a second electrode which has a portion obliquely intersecting the plurality of first electrodes and connects one ends of the plurality of first electrodes, and
a third electrode which has a portion obliquely intersecting the plurality of first electrodes and connects the other ends of the plurality of first electrodes, wherein:
the common electrode includes a pair of fourth electrodes which connects adjacent both ends of the second electrode and the third electrode,
one of the pair of fourth electrodes is connected to one ends of the plurality of first electrodes,
the other of the pair of fourth electrodes is connected to the other ends of the plurality of first electrodes, and
the common electrode protrudes to the outside of the display area and the pair of fourth electrodes is disposed at the outside of the display area.

* * * * *